(12) United States Patent
Allen, Jr. et al.

(10) Patent No.: US 10,589,937 B1
(45) Date of Patent: Mar. 17, 2020

(54) BALL-BELT CONVEYOR WITH SIDE DISCHARGE CAPABILITY

(71) Applicant: A. G. Stacker, Inc., Weyers Cave, VA (US)

(72) Inventors: Clarence C. Allen, Jr., Mt. Crawford, VA (US); Eric Stempihar, Bridgewater, VA (US); Randy Senger, Mount Sidney, VA (US); Dalton Hege, Weyers Cave, VA (US); Joe Wunder, Lexington, VA (US)

(73) Assignee: A.G. STACKER INC., Weyers Cave, VA (US)

( * ) Notice: Subject to any disclaimer, the term of this patent is extended or adjusted under 35 U.S.C. 154(b) by 0 days.

(21) Appl. No.: 16/228,915

(22) Filed: Dec. 21, 2018

(51) Int. Cl.
*B65G 47/24* (2006.01)
*B65G 47/54* (2006.01)
*B65G 17/24* (2006.01)
*B65G 39/20* (2006.01)
*B65G 15/22* (2006.01)
*B65G 13/07* (2006.01)
*B65G 15/42* (2006.01)
*B65G 39/02* (2006.01)

(52) U.S. Cl.
CPC ............ *B65G 39/20* (2013.01); *B65G 13/07* (2013.01); *B65G 15/22* (2013.01); *B65G 15/42* (2013.01); *B65G 17/24* (2013.01); *B65G 39/025* (2013.01); *B65G 47/24* (2013.01); *B65G 47/54* (2013.01); *B65G 2207/14* (2013.01); *B65G 2812/016* (2013.01); *B65G 2812/02148* (2013.01)

(58) Field of Classification Search
CPC ........ B65G 17/24; B65G 47/52; B65G 47/54; B65G 39/20; B65G 47/24; B65G 15/22; B65G 13/07; B65G 15/42; B65G 39/025; B65G 2812/02148; B65G 2207/14; B65G 2812/016
USPC .................................. 198/370.09, 370, 371.3
See application file for complete search history.

(56) References Cited

U.S. PATENT DOCUMENTS

| | | | | |
|---|---|---|---|---|
| 5,238,099 A * | 8/1993 | Schroeder | ............... | B65G 13/07 198/456 |
| 6,152,854 A * | 11/2000 | Carmein | ............... | A63B 22/025 198/779 |
| 7,040,480 B2 * | 5/2006 | Sedlacek | ................ | B65G 15/60 198/457.02 |
| 7,237,670 B1 * | 7/2007 | Ryan | ...................... | B65G 17/24 198/370.09 |
| 7,857,118 B2 | 12/2010 | Jans et al. | | |

(Continued)

OTHER PUBLICATIONS

C&M Conveyor; "MBC Rotator Conveyor"; : http://www.cmconveyor.com/mbc-rotator-conveyor, retrieved Dec. 21, 2018.

(Continued)

*Primary Examiner* — James R Bidwell
(74) *Attorney, Agent, or Firm* — J-Tek Law PLLC; Jeffrey D. Tekanic; Scott T. Wakeman

(57) ABSTRACT

A conveyor system includes an external ball-belt and an internal driver belt for driving balls in the ball-belt. A first drive drives the ball-belt in the longitudinal direction, and a second drive drives the driver belt in a transverse direction. The second drive is located outside the ball-belt and located such that a return portion of the ball-belt runs between the second drive and the driver belt.

20 Claims, 16 Drawing Sheets

(56) References Cited

U.S. PATENT DOCUMENTS

| | | | |
|---|---|---|---|
| 8,172,069 B2 * | 5/2012 | Prakasam | B65G 17/24 198/370.09 |
| 8,807,323 B2 | 8/2014 | Allen, Jr. et al. | |
| 9,169,075 B2 | 10/2015 | Allen et al. | |
| 2004/0226803 A1 * | 11/2004 | Brixius | B65G 47/53 198/370.1 |
| 2005/0150748 A1 * | 7/2005 | Zubair | B65G 17/08 198/853 |

OTHER PUBLICATIONS

C&M Conveyor; "Mesh Ball (MBC) Bundle Conveyor"; http://www.cmconveyor.com/mbc-bundle-conveyor , retrieved Dec. 21, 2018.

* cited by examiner

BALL-BELT CONVEYOR WITH SIDE DISCHARGE CAPABILITY

TECHNOLOGICAL FIELD

The present disclosure is directed to a ball-belt conveyor having at least one external ball-belt for carrying objects in a first direction and an internal belt configured to rotate the balls of the external ball-belt in order to move the objects in a direction other than the first direction, and, more specifically, to a ball-belt conveyor having at least one external ball-belt and an internal belt configured to rotate the balls of the external ball-belt in order to discharge objects carried by the ball-belt from either side of the external conveyor.

BACKGROUND

Ball-belt conveyors are known. Such conveyors include an external belt that runs in a first direction to carry objects on the external belt from an upstream end of the conveyor to a downstream end of the conveyor. The external belt includes an array of openings, and a ball is captively retained and rotatably supported in each of the openings. Portions of each ball project from opposite sides of the belt, and objects on the belt are supported by the upper portions of the balls. An inner belt is mounted inside the external belt and runs in a direction perpendicular to the downstream direction. The portions of each ball that project into the interior of the external belt are in contact with the inner belt. When the inner belt is driven in a first direction, it causes the balls in contact therewith to rotate in the opposite direction. The rotation of the balls causes the objects supported on the tops of the balls to move transversely to the downstream direction. If the external belt is stopped while the internal belt is driven, the movement of the inner belt will cause objects on the external belt to move in a direction perpendicular to the downstream direction. If the external belt and the internal belt are driven at the same time, objects on the external belt will move laterally across the top surface of the external belt while at the same time moving in the downstream direction. A conventional ball-belt conveyor is disclosed in U.S. Pat. No. 5,238,099 to Schroeder et al. which patent is hereby incorporated by reference.

It is often desirable to position conveyors, whether ball-belt conveyors or conventional conveyors, so that the top surface of a conveyor belt is twelve inches off the ground. This standard height allows conveyors to be integrated into existing production lines, many other elements of which are designed to work with a 12 inch conveyor height. This becomes difficult when the conveyor is provided with a lift table for raising and lowering the conveyor because the lift table will generally increase the overall height of the conveyor to more than 12 inches. Therefore, in the past, it was often necessary to dig a pit at the location where the lift table was to be located in order to keep the top of the conveyor mounted on the lift table at the desired 12 inch height above the floor. The present applicant developed an improved conveyor that can be used with a lift table and operate at a 12 inch height without the use of a pit. This conveyor is described in U.S. Pat. No. 8,807,323 to Allen, Jr. et al., which patent is hereby incorporated by reference.

It would be desirable to provide a ball-belt conveyor that can be mounted with its upper surface approximately 12 inches above a support surface without the use of a pit. It would also be desirable to provide a ball-belt conveyor having a configuration that permits objects to be discharged to the front, rear and to both sides of the external conveyor.

SUMMARY

These problems and others are addressed by embodiments of the present invention, a first aspect of which comprises a conveyor system that includes an external conveyor and an internal conveyor. The external conveyor has a frame and at least one ball-belt supported by the frame for movement in a longitudinal running direction relative to the frame. The ball-belt has an internal surface defining a ball-belt interior and an external surface, and a plurality of balls are mounted in the at least one ball-belt such that a first portion of each ball in the at least one ball-belt extends beyond the external surface and such that a second portion of each ball in the at least one ball-belt extends beyond the internal surface. The external conveyor also includes a first drive for driving the at least one ball-belt in the longitudinal direction. The internal conveyor includes a driver belt supported by a first end roller and a second end roller, and the driver belt has a top surface in contact with the second portions of a subset of the plurality of balls and extends in the transverse direction relative to the frame. The internal conveyor is located at least partially in the interior of the at least one ball-belt. A second drive is configured to move the driver belt in the transverse direction and is located outside the interior of the at least one ball-belt and is connected to the driver belt by a power transmission means such as a belt or chain.

Another aspect of the disclosure comprises a conveyor system having a frame that includes a first longitudinal support having a first end and a second end and a second longitudinal support having a first end and a second end and a first transverse support connecting the first end of the first longitudinal support to the first end of the second longitudinal support and a second transverse support connecting the second end of the first longitudinal support to the second end of the second longitudinal support. The frame also includes a center longitudinal support connecting a midpoint of the first transverse support to a midpoint of the second transverse support. The frame supports an external conveyor that includes a first support shaft extending between the first end of the first longitudinal support and the first end of the second longitudinal support and a second support shaft extending between the second end of the first longitudinal support shaft and the second end of the second longitudinal support shaft. A first ball-belt is mounted on the first and second support shafts along the first longitudinal support, and a second ball-belt is mounted on the first and second support shafts along the second longitudinal support. Each of the first and second ball-belts has an internal surface defining a ball-belt interior and also has an external surface. A plurality of balls are mounted in the ball-belts such that a first portion of each ball in the first and second ball-belts extends beyond the respective external surfaces of the first and second ball-belts and such that a second portion of each ball in the first and second ball-belts extends beyond the internal surface of the respective first and second ball-belts. The system includes a first drive operatively connected to the first support shaft for driving the first and second ball-belts in the longitudinal direction. The system also includes an internal conveyor having a driver belt supported by a first end roller and a second end roller. The driver belt has a top surface in contact with the second portions of a subset of the plurality of balls, and the driver belt extends in the transverse direction. The internal conveyor has a first portion in the interior of the first ball-belt and a second portion in the interior of the second ball-belt. The system also includes a second drive mounted to the center longitudinal support and operatively connected to the driver belt for driving the driver belt in the transverse direction.

DETAILED DESCRIPTION

Figure 1:
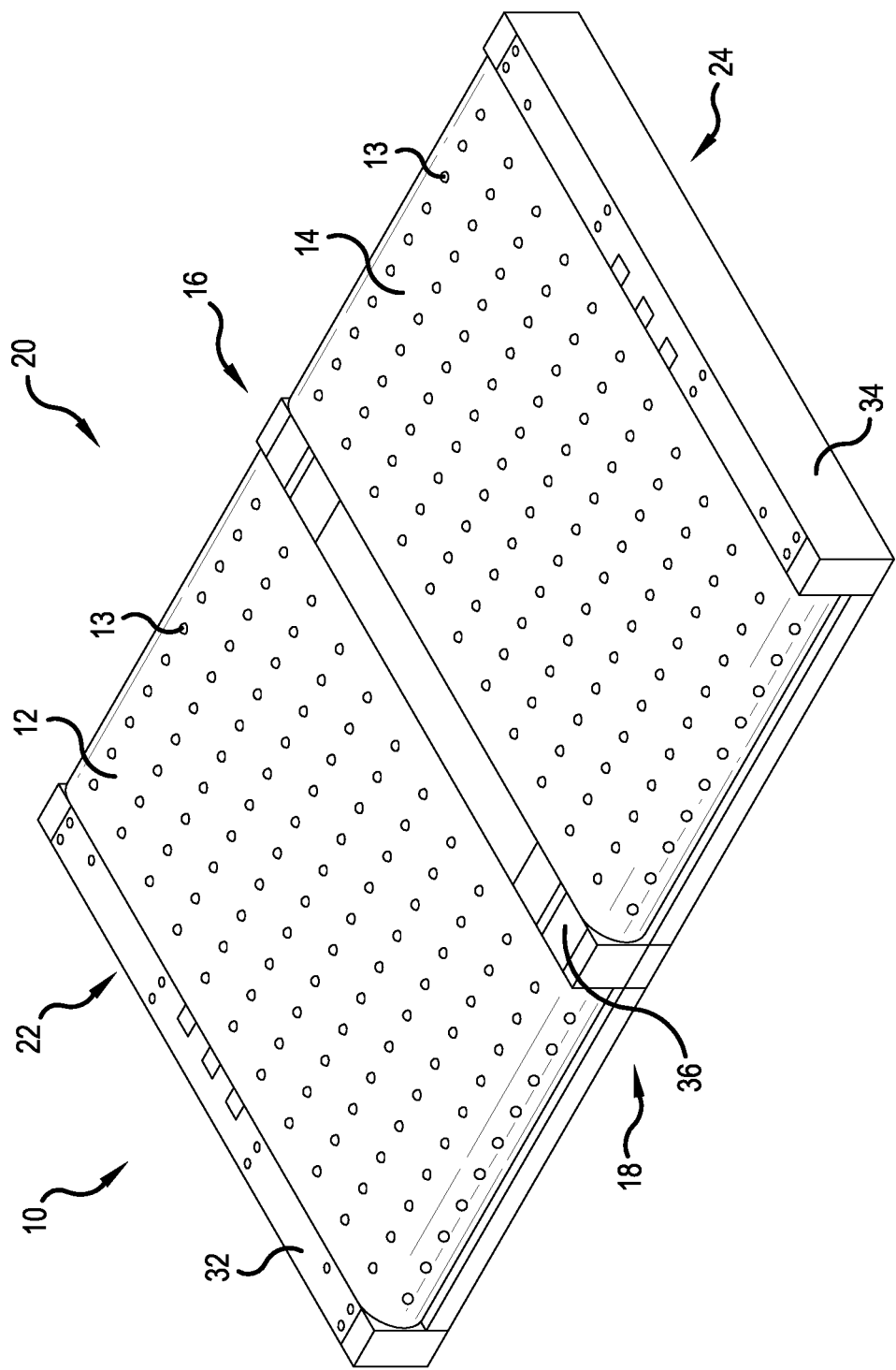
FIG. 1 is a perspective view of a ball-belt conveyor having first and second external belts and an internal belt according to a first embodiment of the present disclosure.
Figure 6:
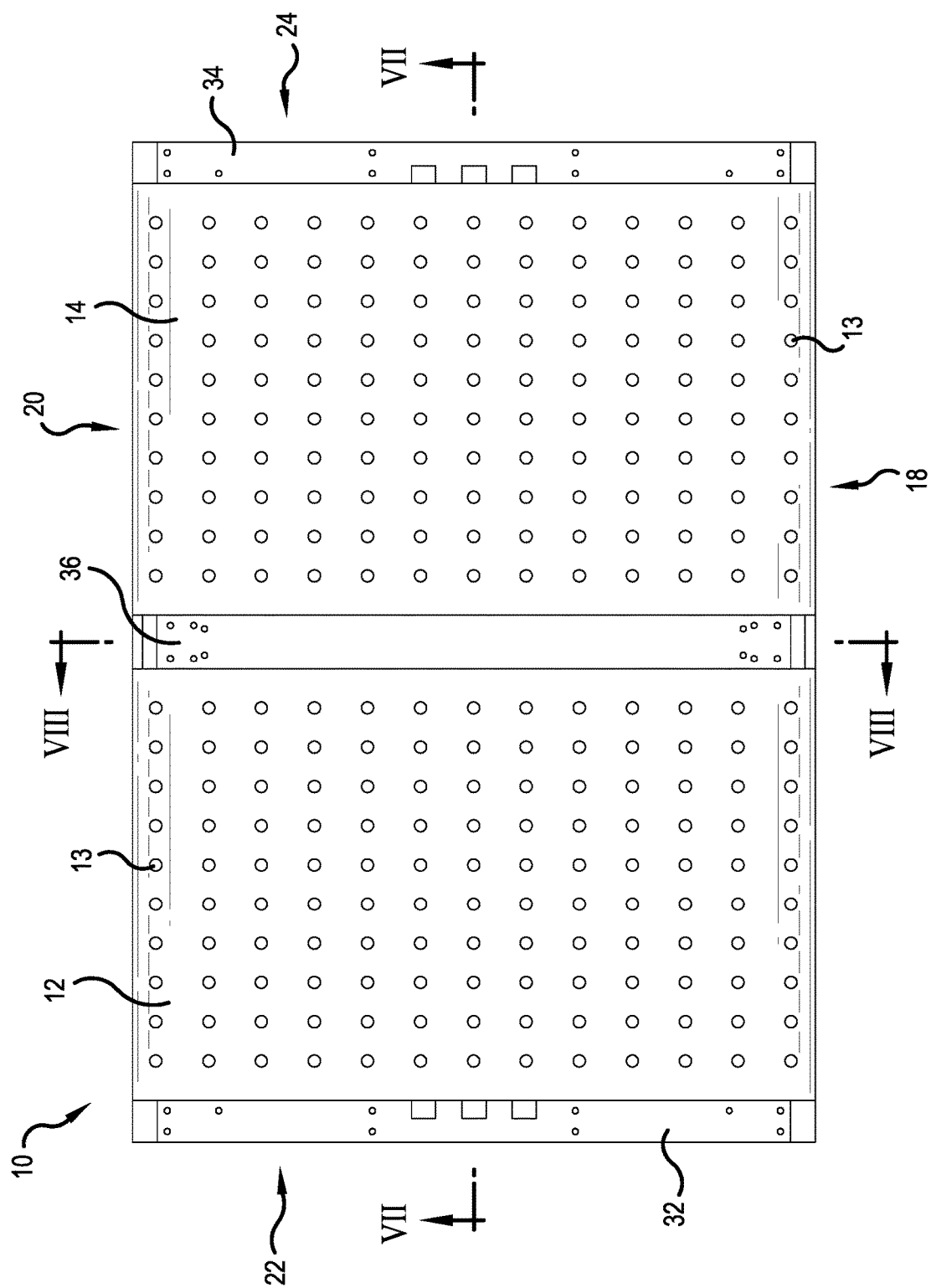
FIG. 6 is a top plan view of the ball-belt conveyor of FIG. 1.

Referring now to the drawings, wherein the showings are for the purpose of illustrating an embodiment of the invention only and not for the purpose of limiting same, FIGS. 1 and 6 show a ball-belt conveyor 10 according to the present disclosure that includes a first external belt 12 and a second external belt 14. The second external belt 14 runs parallel to the first external belt and separated from the first external belt 12 by a gap 16. A plurality of balls 13 are captively retained by each of the external belts 12, 14 such that they can rotate freely in the external belts 12, 14, but cannot easily be removed from these belts. The conveyor 10 has a front end 18, a rear end 20, a left side 22 and a right side 24. The relative terms "front," "rear," "left," and "right," are used for ease of reference and are intended to describe relative portions of the conveyor 10 when it is installed for operation. However, as discussed hereinafter, the conveyor 10 can run in either direction, and thus, when reversed, the front or upstream end will become the rear or downstream end, etc., as will readily be understood by persons of ordinary skill in the art. Furthermore, the region enclosed by each of the first and second external belts 12, 14 may be referred to as the interior of the external conveyor.

Figure 3:
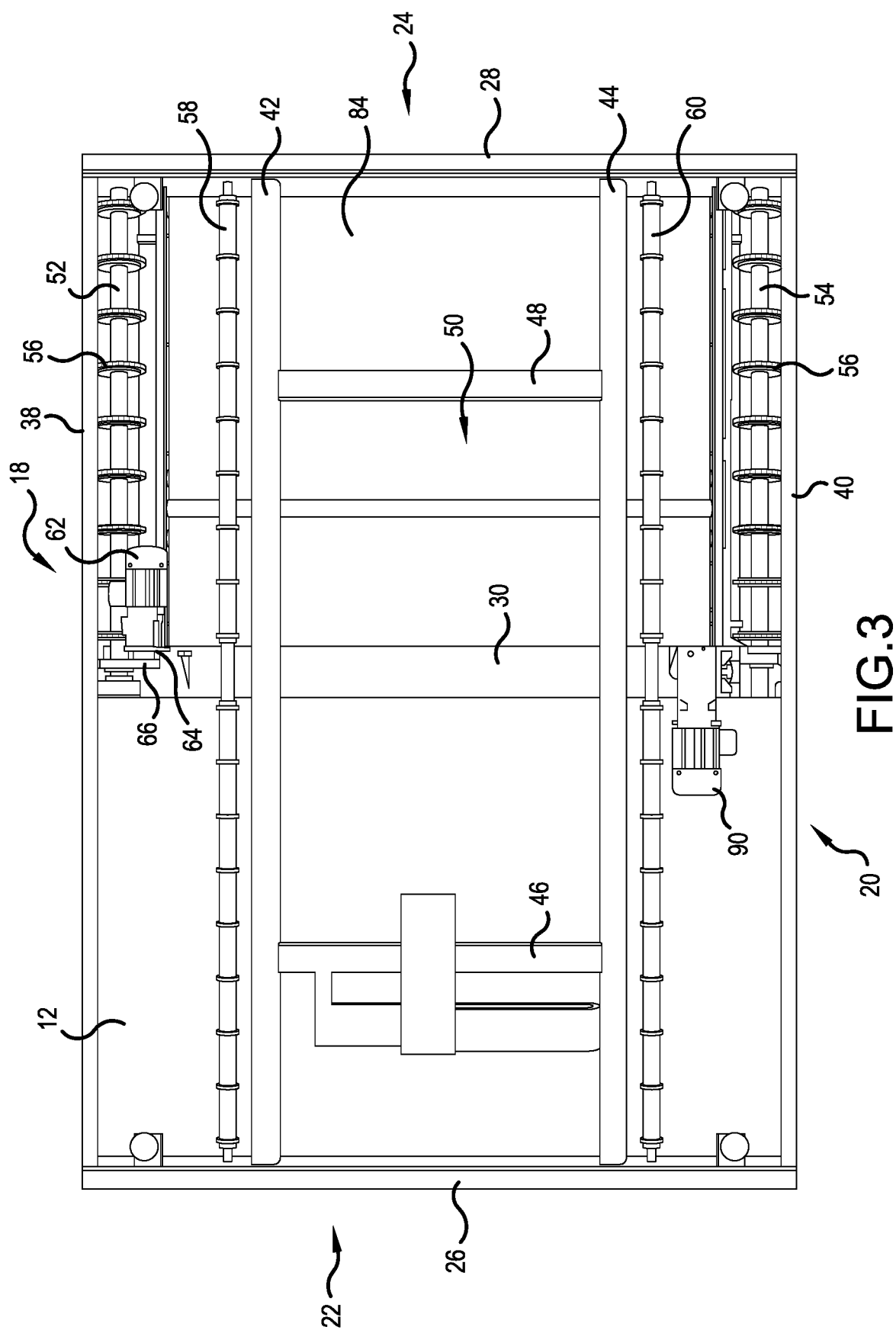
FIG. 3 is bottom plan view of the ball-belt conveyor of FIG. 2.
Figure 7:
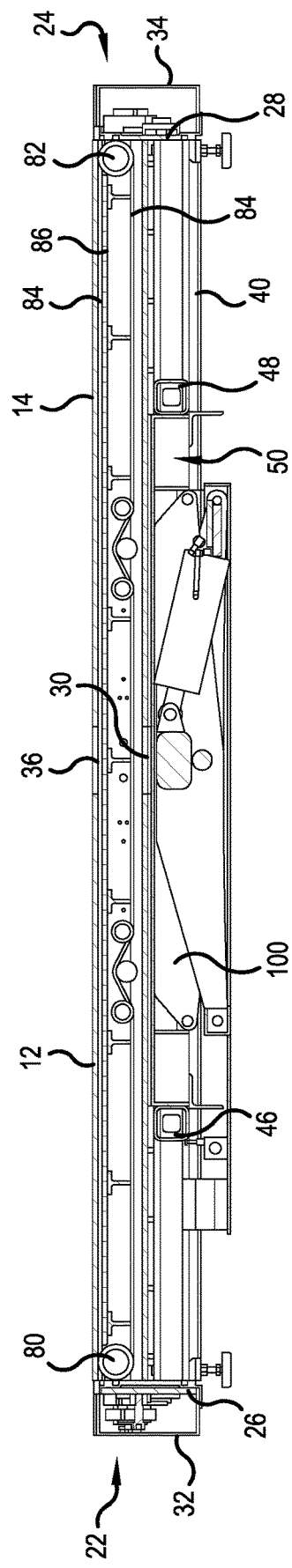
FIG. 7 is a sectional side elevational view taken in the direction of line VII-VII in FIG. 6.

As can be seen for example, in FIGS. 3 and 7, the conveyor 10 includes a frame formed from a left side member 26 a right side member 28 and a center member 30 that run in the longitudinal direction, and, as seen in FIG. 1, a left side housing 32 is mounted on the left side member, a right side housing 34 is mounted on the right side member 28, and a center plate 36 is mounted above the center member 30 over the gap 16 between the first and second external belts 12, 14. The left and right side housings 32, 34 are omitted from some Figures, such as FIG. 3, for clarity. A front transverse member 38, a rear transverse member 40, a front-intermediate transverse member 42 and a rear-intermediate transverse member 44 extend between and connect the front, rear, front-intermediate and rear intermediate portions of the left side member 26 and the right side member 28. A left intermediate member 46 and a right intermediate member 48 connect the front intermediate transverse member 42 and the rear intermediate transverse member 44 and define therewith an opening into a lift-table receiving space 50 that will be described hereinafter.

Figure 5:
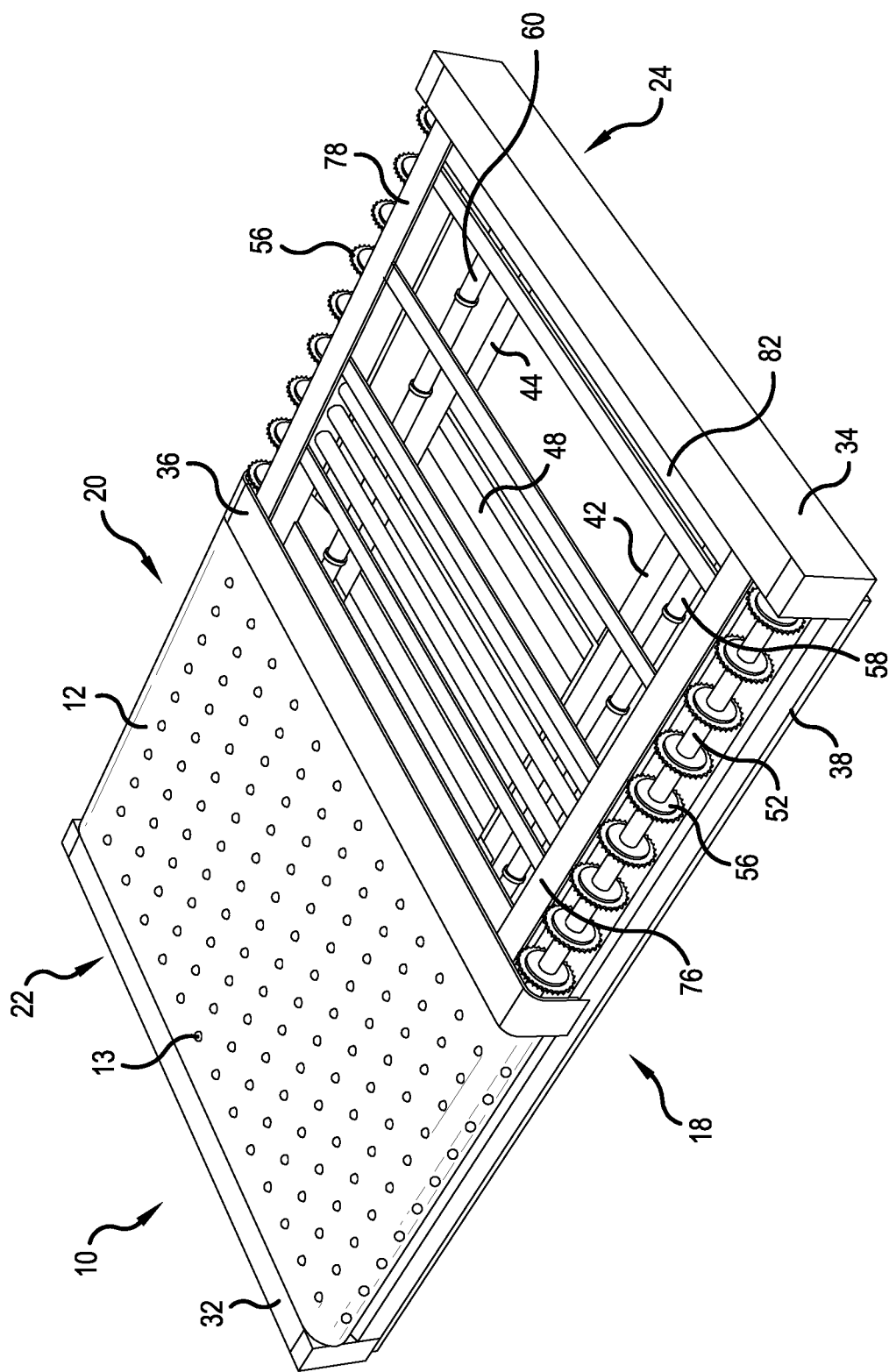
FIG. 5 is a perspective view of the ball-belt conveyor of FIG. 4 with the support platform removed.
Figure 10:
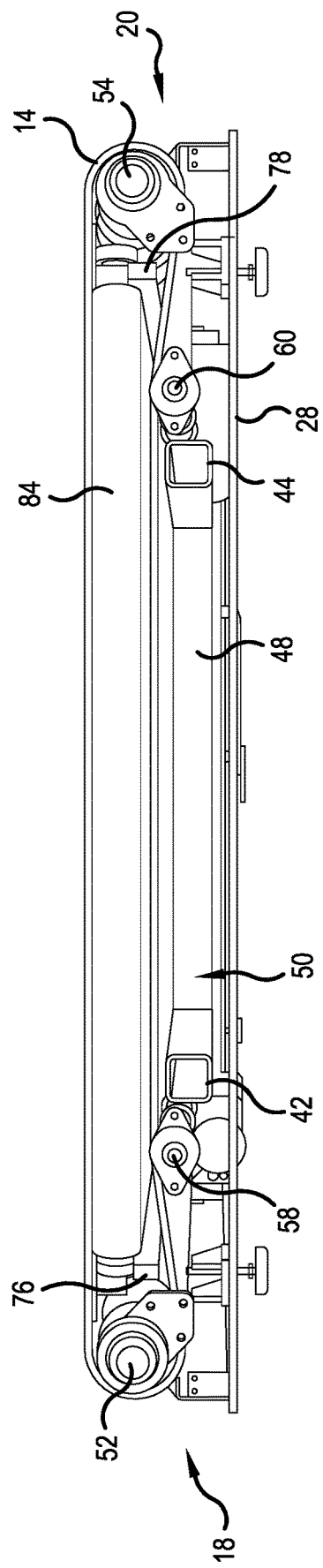
FIG. 10 is a right side elevational view of the ball-belt conveyor of FIG. 1 with a side cover and other elements removed to show belts and supports.

A front drive shaft 52 extends along the front transverse member 38 and through each of the left side member 26, the center member 30 and the right side member 28, and a rear drive shaft 54 extends along the rear transverse member 40 and through each of the left side member 26, the center member 30 and the right side member 28, and each of the front and rear drive shafts 52, 54 includes a plurality of wheels 56 configured to engage the interior surfaces of the first and second external belts 12, 14 such that the external belts 12, 14 rotate when the first drive shaft 52 and/or the second drive shaft 54 is driven. A front tensioning roller 58 (FIGS. 3, 5 and 10) extends transversely from the left side member 26 beneath the center member 30 to the right side member 28 forward of the front intermediate transverse member 42, and a rear tensioning roller 60 extends transversely from the left side member 26 beneath the center member 30 to the right side member 28 rearward of the rear intermediate transverse member 44. The first external belt 12 and the second external belt 14 are mounted on the wheels 56 of the front and rear drive shafts 52, 54 such that the drive shafts 52, 54 are located in the interiors of the first and second external belts 12, 14, and the front and rear tensioning rollers 58, 60 are located outside the interior of the first and second external belts 12, 14 and press the return portions of the first and second external belts 12, 14 (e.g., portion 12b of the first external belt 12 in FIG. 8) toward the transport portions of the first and second external belts 12, 14 (e.g., portion 12a of the first external belt 12 in FIG. 8) so that the return portions of the first and second external belts travel over the front intermediate transverse member 42 and the rear intermediate transverse member 44 and over the lift table receiving space 50.

Figure 11:
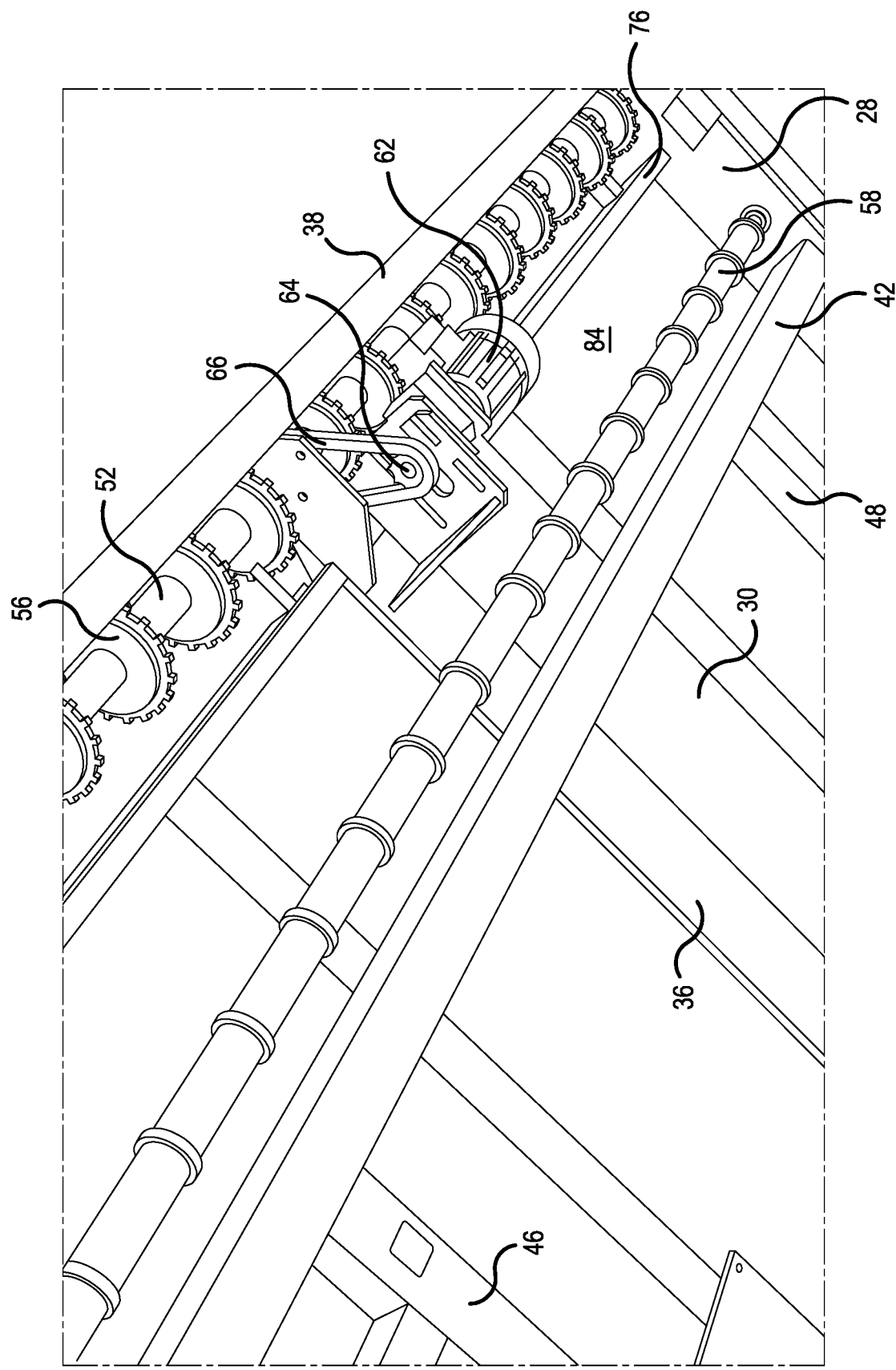
FIG. 11 is a bottom perspective view of the ball-belt conveyor of FIG. 1 showing the drive for driving the external belts.

Referring now to FIGS. 3 and 11, a first drive 62, such as an electric motor, is mounted on the center member 30 and includes a rotor shaft 64 connected to the front drive shaft 52 by a drive belt 66 and is configured to rotate the front drive shaft 52 in first and second directions. Alternately, a drive chain or transmission shaft or other mechanical linkage (not illustrated) could be used to operatively connect the first drive 62 to the first drive shaft 52.

Figure 9:
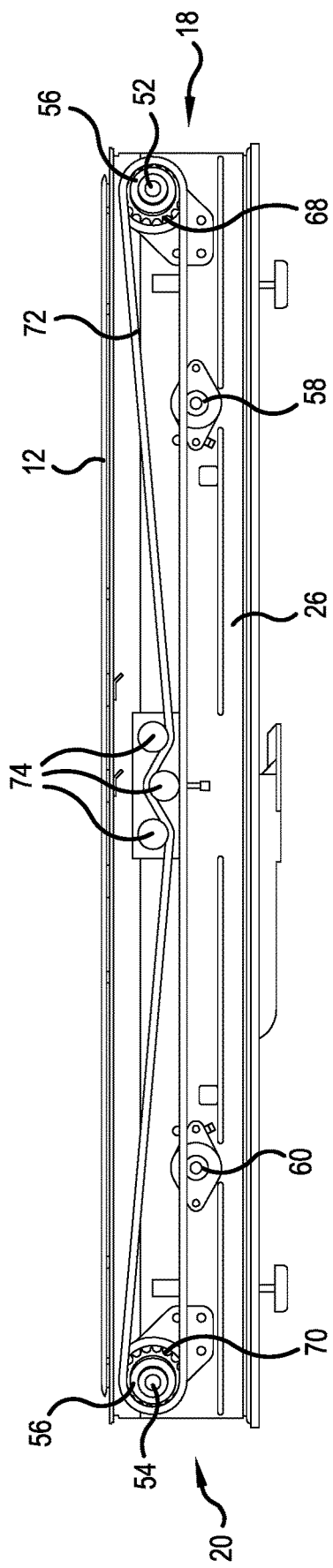
FIG. 9 is a left side elevational view of the ball-belt conveyor of FIG. 1 with a side cover removed to show belts and supports.

As illustrated, for example, in FIG. 9, the front drive shaft 52 includes an end portion that extends through the left side member 26 and a front drive gear 68 mounted on this end portion, and the rear drive shaft 54 includes an end portion that extends through the left side member 26 and a rear drive gear 70 mounted on this end portion. A drive connector belt 72 connects the front drive gear 68 to the rear drive gear 70, and a plurality of tensioning rollers 74 maintain tension on the drive connector belt 72. The drive connector belt 72 positively connects the front drive shaft 52 to the rear drive shaft 54 so that the first and second external belts 12, 14 are driven by both the front drive shaft 52 and the rear drive shaft 54 when they run in a forward direction, e.g., such that the transport surface 12a of the first external belt 12 moves in a direction from the front end 18 of the ball-belt conveyor 10 toward the rear end 20 of the ball-belt conveyor 10 and when they are driven in the opposite direction. End-driven conveyors can generally only be driven in a single direction, a direction that pulls the upper or transport surface of a belt toward the drive roller; the disclosed configuration allows either the front drive shaft 52 or the rear drive shaft 54 to pull the transport surface of the first external belt toward the respective drive shaft regardless of the direction in which the first external belt is moving.

Figure 2:
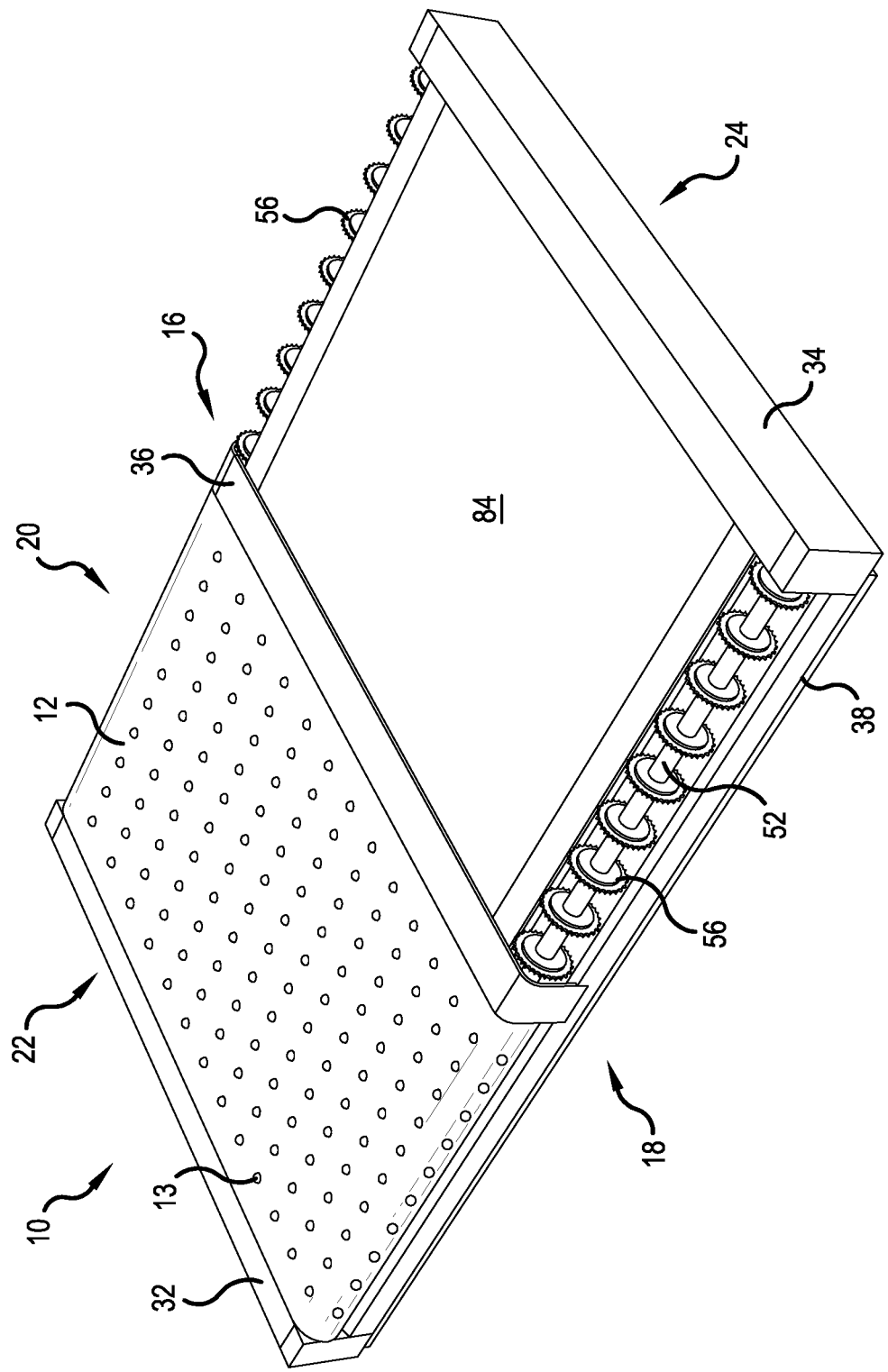
FIG. 2 is a perspective view of the ball-belt conveyor of FIG. 1 with one of the external belts removed to show a portion of the internal belt.
Figure 4:
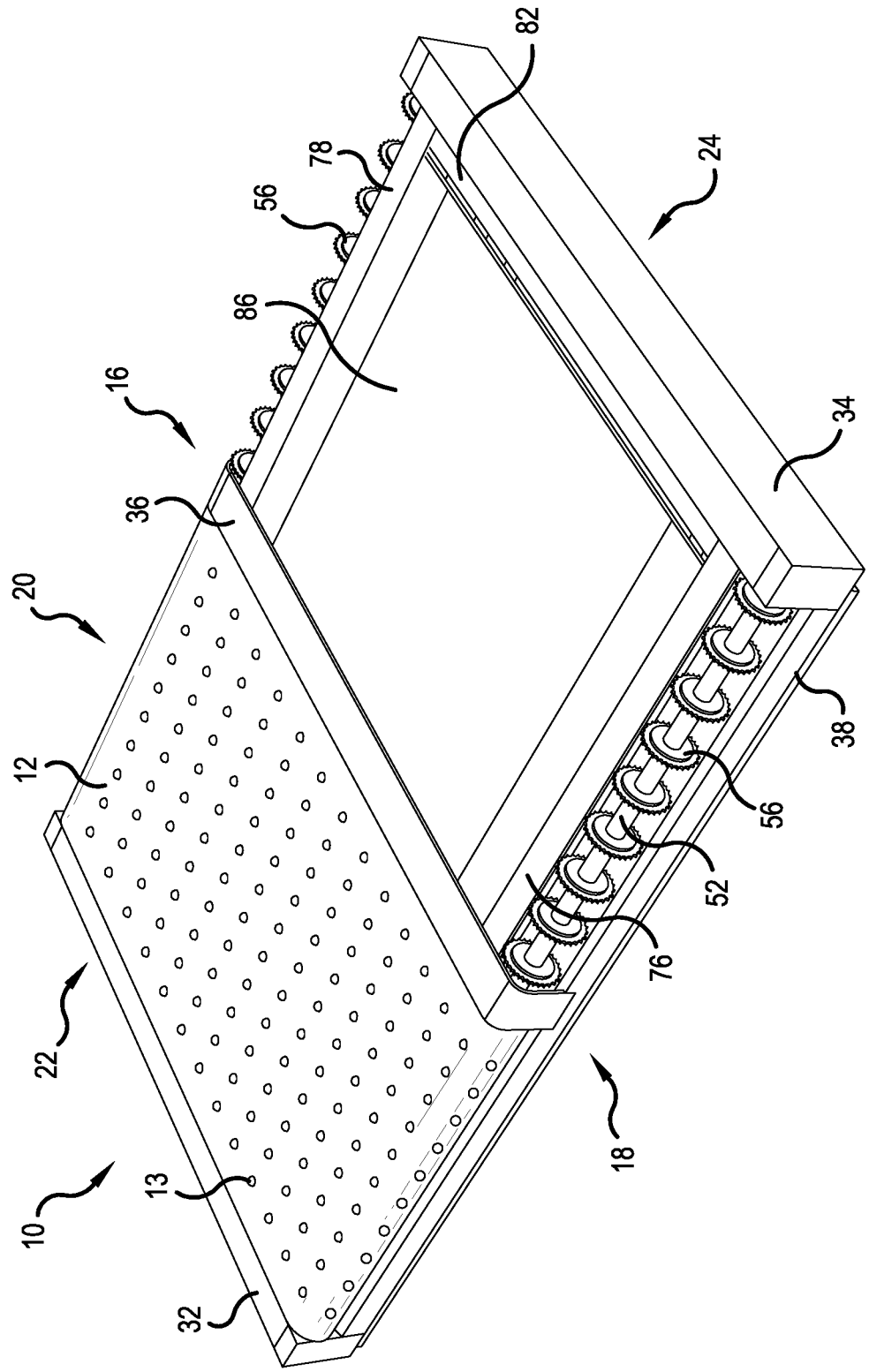
FIG. 4 is a perspective view of the ball-belt conveyor of FIG. 2 with the internal belt removed to show the support platform for the internal belt.

The ball-belt conveyor 10 also includes an internal conveyor (belt 84 of which can be seen in FIG. 2) located in the interior of the external conveyor and which is configured to run in a direction perpendicular to the direction of the external conveyor. The internal conveyor includes a first frame side 76 (FIGS. 8 and 11) that is proximate and parallel to the front drive shaft 52, and a second frame side 78 that is proximate and parallel to the rear drive shaft 54. As shown for example in FIG. 7, a left end roller 80 extends between the first frame side 76 and the second frame side 78 near the left side 22 of the ball-belt conveyor 10, and a right end roller 82 extends between the first frame side 76 and the second frame side 78 near the right side 24 of the ball-belt conveyor 10, and a driver belt 84 is supported by the left end roller 80 and the right end roller 82. The driver belt 84 is preferably formed from a soft rubber or other material having a coefficient of friction high enough so that the balls 13 will roll along the upper surface of the driver belt 84 (instead of sliding) when the driver belt 84 and the first and/or second external belts 12, 14 move relative to each other. An internal plate 86, which can be seen in FIG. 4, is located in the interior of the driver belt 84 and supported by the first frame side 76 and the second frame side 78. The internal conveyor is positioned such that the upper surface of the driver belt 84 makes contact with the portions of the balls 13 that extend into the interior of the external belts 12, 14 so that movement of the driver belt 84 can cause the balls 13 to rotate relative to the first and second external belts 12, 14 as will be described hereinafter. The driver belt 84 is supported by the internal plate 86 as are loads that press the external belts 12, 14 downwardly against the driver belt 84.

Figure 12:
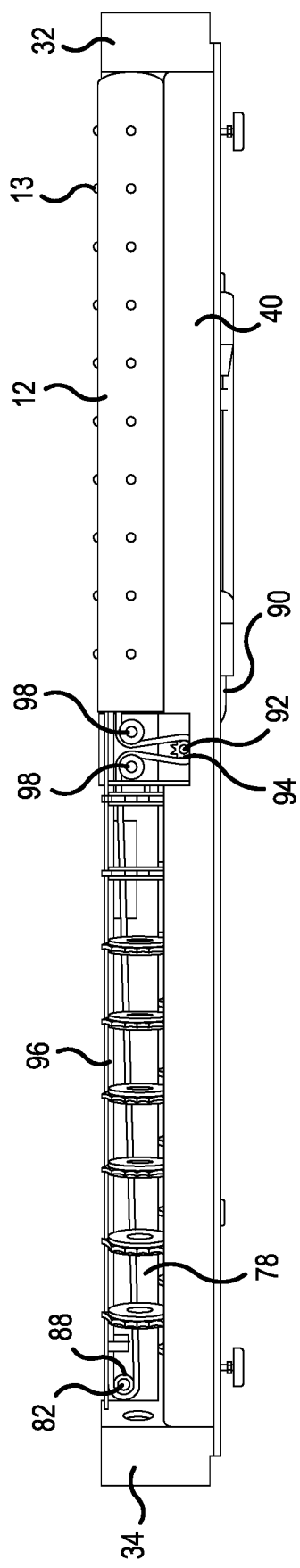
FIG. 12 is a rear elevational view of the ball-belt conveyor of FIG. 1 with one external belt and the drive shaft for the external belt removed to show the drive for the internal belt.
Figure 13:
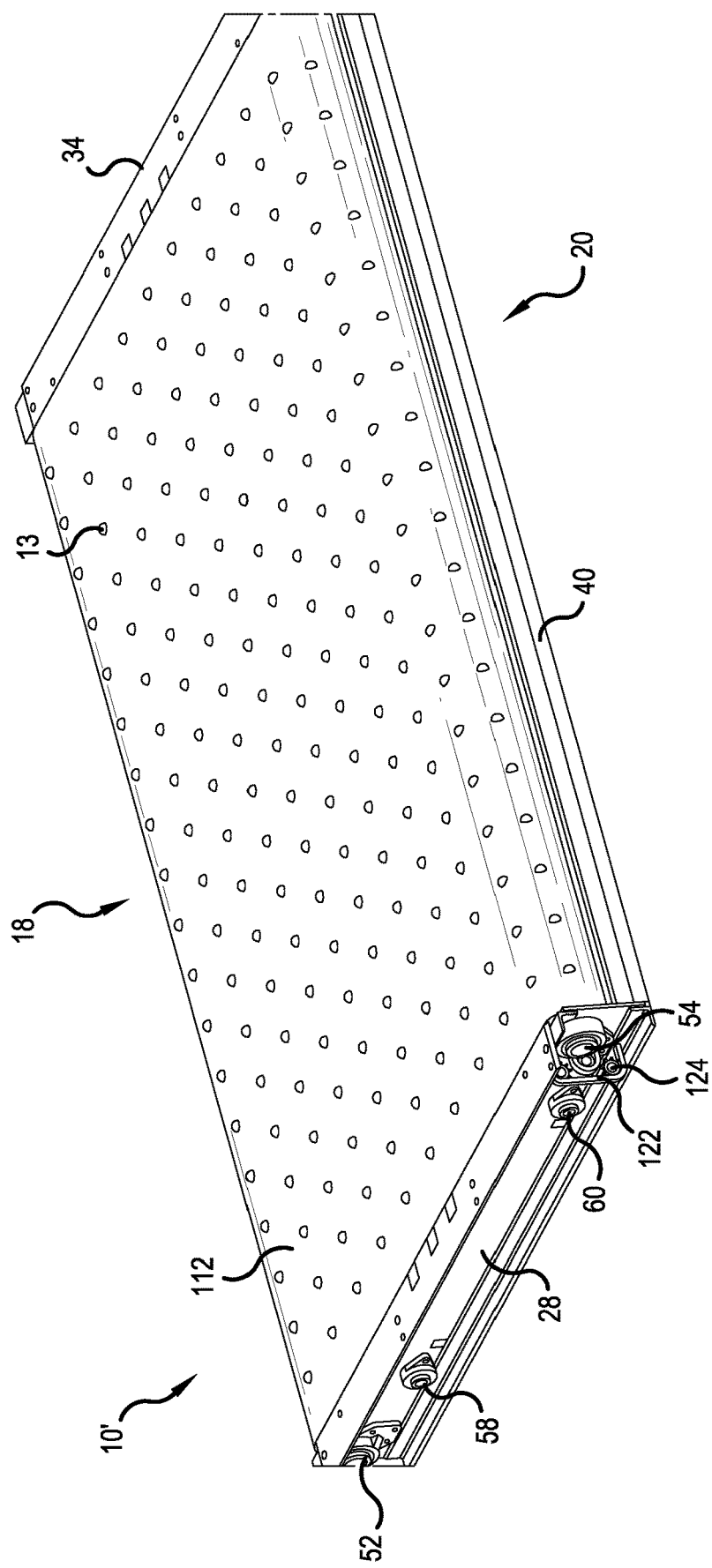
FIG. 13 is a top perspective view of a ball-belt conveyor having a single external belt according to another embodiment of the present disclosure.
Figure 14:
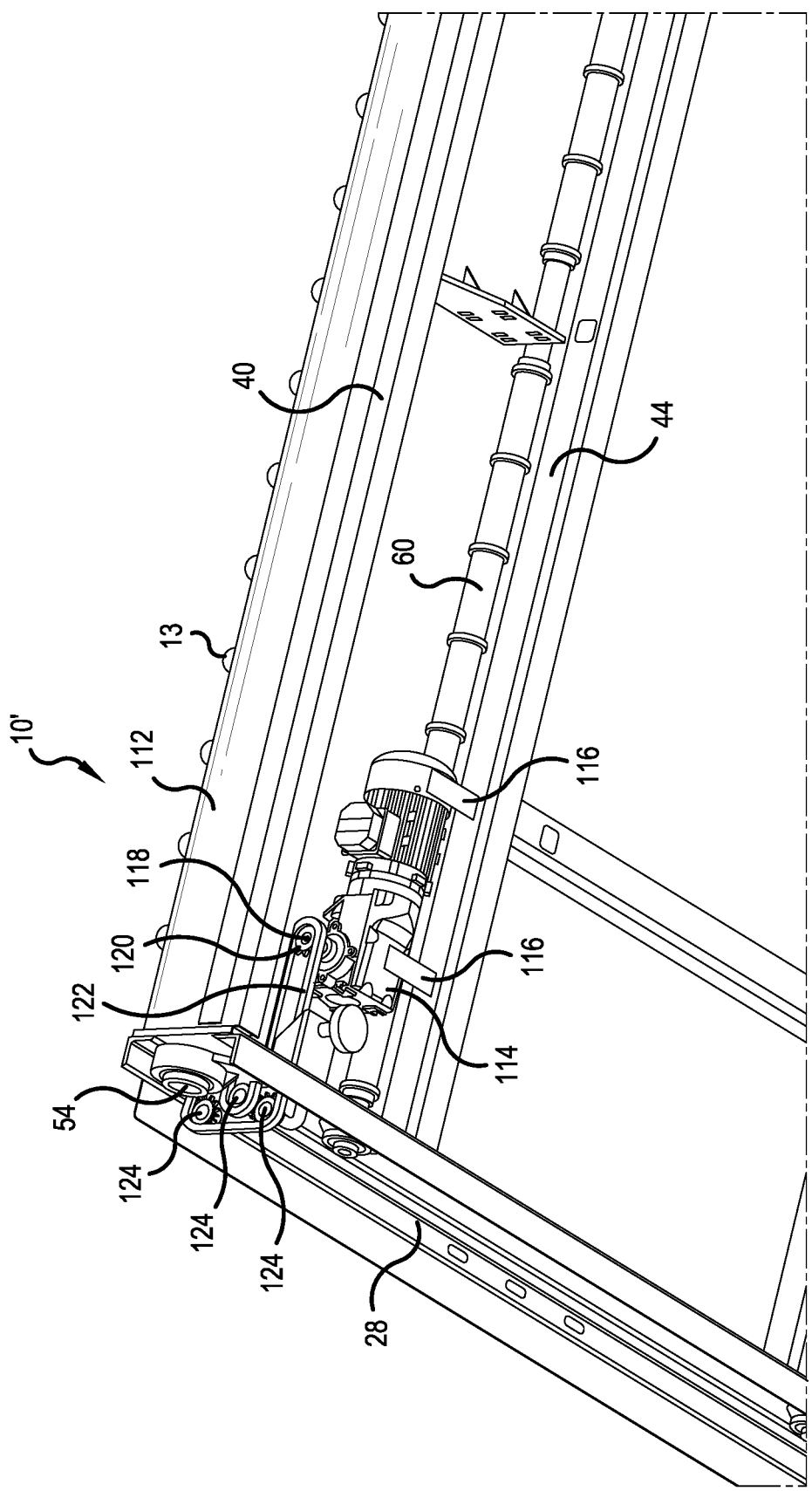
FIG. 14 is a bottom perspective view of a drive for the internal belt of the ball-belt conveyor of FIG. 13.
Figure 15:
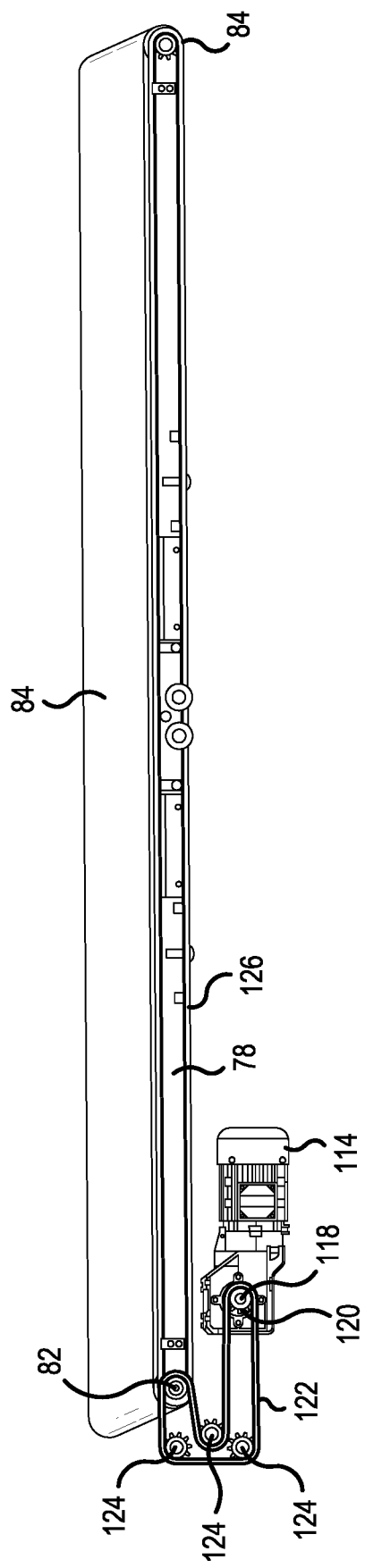
FIG. 15 is a side elevational view of the internal conveyor of the ball-belt conveyor of FIG. 13.

Drive gears 88 (FIG. 12) are connected to ends of the left end roller 80 and the right end roller 82 that extend through the second frame side 78. A second drive 90 (FIGS. 3 and 12), an electric motor, for example, includes a rotor shaft 92 supporting a gear 94 and an internal drive belt 96 extends around the gear 94, diverter rollers 98 and the drive gears 88 (only one of which is visible in FIG. 12) so that the second drive 90 can drive the left end roller 80 and the right end roller 82 and thus the driver belt 84 supported by these end rollers in first and second directions transverse to the direction of movement of the first and second external belts 12, 14. The first drive 62 and the second drive 90 are controlled by a controller (not illustrated), such as a microcontroller, microprocessor or other computer processor.

Figure 8:
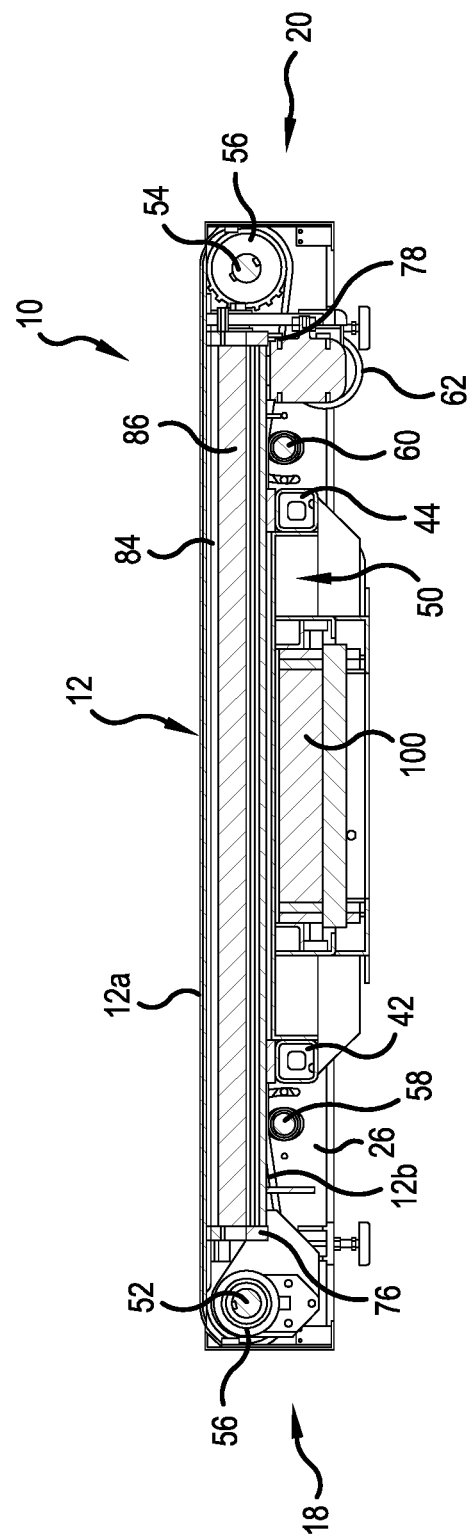
FIG. 8 is a sectional end elevational view taken in the direction of line VIII-VIII in FIG. 6.

A substantially conventional lift table 100, portions of which are illustrated in FIGS. 7 and 8 but which is not shown in other Figures, is mounted such that a portion thereof extends into the lift-table receiving space 50 and is connected to the frame of the ball-belt conveyor 10, specifically to the front intermediate transverse member 42 and/or the rear intermediate transverse member 44 and/or the left intermediate member 46 and/or the right intermediate member 48 and is configured to raise and lower the ball-belt conveyor 10 as needed.

The operation of the ball-belt conveyor will now be described. In a first mode, the first drive 62 is actuated to rotate the rotor shaft 64 in a first direction. The rotation of the rotor shaft 64 causes the first drive shaft 52 to rotate, and the rotation of the first drive shaft 52 is transmitted to the second drive shaft 54 by the drive connector belt 72. This rotation of the first and second drive shafts 52, 54 moves the upper, transport surfaces of the first and second ball-belts 12, 14 in the direction from the front end 18 toward the rear end 20. At this time, the driver belt 84 of the internal conveyor is stationary. The balls 13 in the first and second ball-belts 12, 14 are pulled along the upper surface of the driver belt 84 by this movement of the first and second external belts 12, 14, and, because the balls 13 are retained in openings in the first and second external belts 12, 14, the balls 13 rotate in the first and second external belts 12, 14, and roll along the upper surface of the driver belt 84. The movement of the first and second external belts 12, 14 toward the rear end 20 of the ball-belt conveyor causes the balls 13 to also roll in a forward direction such that objects supported on the top surfaces of the balls 13 are moved toward the rear end 20 of the ball-belt conveyor by the combined linear motion of the external belts 12, 14 and the rotating top surfaces of the balls 13. Because, as described above, the external conveyor is reversible, objects can also be transported from the rear end 20 of the ball-belt conveyor 10 toward the front end 18 by reversing the direction of rotation of the rotor shaft 64.

In a second mode, the first drive 62 is stopped so that the first and second external conveyors 12, 14 are held stationary relative to the frame of the ball-belt conveyor 10. The second drive 90 is then actuated to move the upper surface of the driver belt 84 in a first direction, for example, toward the right side 24 of the ball-belt conveyor 10 in FIG. 2. This movement of the driver belt 84 causes the balls 13 in the first and second external belts 12, 14 to rotate so that the top surfaces of the balls 13, that is, the surfaces of the balls 13 that project above the upper surfaces of the first and second external belts 12, 14, move away from the right side 24 of the ball-belt conveyor. In this manner, objects supported by the balls 13 move toward the left side 22 of the ball-belt conveyor and, if the movement of the driver belt 84 continues, are discharged therefrom. Reversing the direction of the second drive 62 will move objects supported by the balls 13 in the opposite direction and allow the objects to be discharged from the opposite side of the conveyor.

In a third mode, the first drive 62 and the second drive 90 are operated at the same time to impart motion to objects on the ball-belt conveyor 10 that has a first component in the running direction of the first and second belts 12, 14, and a second component in the running direction of the driver belt 84 so that objects supported on the balls 13 move in a diagonal direction relative to the frame.

Beneficially, the two-belt design of the disclosed ball-belt conveyor 10 allows the driver belt 84 to be driven by a drive that is located beneath the first and second external belts 12, 14 and beneath the driver belt 84, that is, by a drive that does not project outwardly beyond the "footprints" of any of the conveyor belts because the gap 16 between the first and second external belts 12, 14, provides a space for the drive belt 66 to pass. With this arrangement, as shown, for example, in FIGS. 8 and 10, the return portion of the second external belt 14 passes between the first drive 62 and the driver belt 84, and the return portion of the first external belt 12 passes between the second drive and the driver belt. The disclosed configuration also allows the first drive 62 and the second drive 90 to be located substantially inside the frame of the ball-belt conveyor 10 to maintain the overall height of the ball-belt conveyor 10 at less than or equal to 12 inches. Finally, the configuration allows for a lift table receiving space 50 to be provided in the center portion of the conveyor so that this ball-belt conveyor can be supported by a lift table without the use of a pit.

The ball-belt conveyor 10 having two external belts 12, 14 allows for the driver belt 84 to be driven by a drive located at a center portion of the driver belt as described above. However, it is also possible to obtain advantages of the disclosed invention when only a single external belt is used. In a second embodiment of the invention, a ball-belt conveyor 10' includes a single external ball-belt 112 having balls 13 as illustrated in FIGS. 13-16.

In this embodiment, a second drive 114 for driving the driver belt 84 is mounted on the rear intermediate transverse member 44 by brackets 116. The second drive 114 includes a drive shaft 118 on which a drive gear 120 is supported. A drive belt 122 is operatively connected between the right end roller 82 of the driver belt 84 and the drive gear 120 which drive belt 122 is supported on the side of right side member 28 by three gears 124. Thus, the drive belt 122 extends from the drive gear 120, through the right side member 28, around the gears 124 and to the right end roller 82 of the driver belt 84. A timing belt 126 (FIG. 15) connects the right end roller 82 of the driver belt 84 to the left end roller 80 of the driver belt 84 so that the left and right end rollers 82, 80 rotate simultaneously when the right end roller 82 is driven. This positive connection between the two end rollers 80, 82 allows the driver belt 84 to be driven in first and second direction by a drive belt mounted at one of the end rollers.

Figure 16:
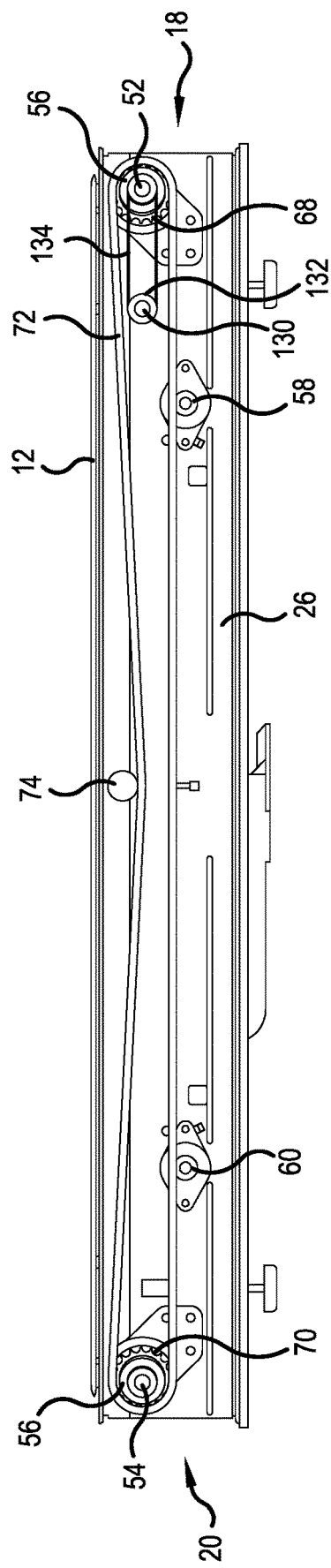
FIG. 16 is a left side elevational view of the ball-belt conveyor of FIG. 13 with a side cover removed to show part of the drive mechanism for the external belt.

FIG. 16 illustrates a modified version of the drive mechanism for driving the front drive shaft 52. In this embodiment, the first drive 62 is mounted adjacent to the left side member 26 such that a drive shaft 130 extending from the first drive 62 extends through the left side member 26. A drive gear 132 is mounted on the drive shaft 130 and is connected to the front drive shaft 52 by front drive belt 134. In this manner, the first drive 62 can drive the external belt 112 while still being located beneath the external belt 112 thus leaving the all sides of the ball-belt conveyor 10' free for the discharge of products from the conveyor.

The operation of the ball-belt conveyor 10' of this second embodiment is substantially the same as the operation of the ball-belt conveyor 10 of the first embodiment described above and is therefore not repeated.

The present invention has been described herein in terms of preferred embodiments. However, modifications and additions to these embodiments will become apparent to persons of ordinary skill in the art upon a reading of the foregoing description. It is therefore intended that all such modifications and additions to the disclosed embodiments form a part of the present invention to the extent they fall within the scope of the several claims appended hereto.

What is claimed is:

1. A conveyor system comprising:
   an external conveyor including:
      a frame,
      at least one ball-belt supported by the frame, the at least one ball-belt having a transport portion configured to move in a longitudinal running direction relative to the frame and a return portion configured to move in a direction opposite the longitudinal running direction and an internal surface defining a ball-belt interior and an external surface,
      a plurality of balls mounted in the at least one ball-belt such that a first portion of each ball in the at least one ball-belt extends beyond the external surface of the at least one ball-belt and such that a second portion of each ball in the at least one ball-belt extends beyond the internal surface of the at least one ball-belt, and
      a first drive configured to drive the at least one ball-belt in the longitudinal direction;
   an internal conveyor located at least partially in the interior of the at least one ball-belt and including:
      a first end roller,
      a second end roller,
      a driver belt supported by the first and second end rollers and having a top surface in contact with the second portions of a subset of the plurality of balls and extending in a transverse direction relative to the frame,
      a second drive configured to move the driver belt in the transverse direction, the second drive being located outside the interior of the at least one ball-belt, and
      a power transmission means connecting the second drive to the driver belt,
   wherein the return portion of the at least one ball-belt runs between the second drive and the driver belt.

2. The conveyor system according to claim 1, wherein the power transmission means comprises a drive shaft or a drive chain or a drive belt.

3. The conveyor system according to claim 2, wherein the return portion of the at least one ball-belt runs between the first drive and the driver belt.

4. The conveyor system according to claim 3,
   wherein the at least one ball-belt comprises a first ball-belt and a second ball-belt, the first ball-belt being transversely spaced from the second ball-belt by a gap,
   wherein a first portion of the internal conveyor is located in the interior of the first ball-belt and a second portion of the internal conveyor is located in the interior of the second ball-belt, and
   wherein the power transmission means extends through the gap.

5. The conveyor system according to claim 4, wherein the first end roller is located in the interior of the first ball-belt and the second end roller is located in the interior of the second ball-belt.

6. The conveyor system according to claim 4, wherein the frame comprises a first side rail extending along a first side of the first ball-belt, a second side rail extending along a first side of the second ball-belt and at least one center rail portion below the gap and parallel to the first side rail, wherein the second drive is mounted on the at least one center rail portion.

7. The conveyor system according to claim 6, wherein the first drive is located between the first side rail and the second side rail.

8. The conveyor system according to claim 7,
including a first drive roller extending between the first side rail and the second side rail and a second drive roller extending between the first side rail and the second side rail,
wherein,
the first ball-belt and the second ball-belt are mounted on the first drive roller and the second drive roller,
the power transmission means is connected to the first support shaft at the gap,
an end portion of the first support shaft extends through the first side rail such that an end of the first support shaft is located on a side of the first side rail opposite from the power transmission means,
an end portion of the second support shaft extends through the first side rail such that an end of the second support shaft is located on a side of the first side rail opposite from the power transmission means, and
a timing belt or a timing chain positively connects the end portion of the first support shaft to the end portion of the second support shaft.

9. The conveyor system according to claim 8, including a first tensioning roller between the first drive roller and the second drive roller and a second tensioning roller between the first tensioning roller and the second drive roller, the first and second tensioning rollers being configured such that a spacing between the transport portion and the return portion of the first ball-belt is less than a diameter of the first drive roller.

10. The conveyor system according to claim 9 including a lift table receiving space inside the frame of the external conveyor between the first tensioning roller and the second tensioning roller.

11. The conveyor system according to claim 10 including a lift table extending into the lift table receiving space.

12. The conveyor system according to claim 4, wherein an upper surface of the first ball-belt and an upper surface of the second ball-belt lie in a common plane.

13. The conveyor system according to claim 1,
wherein the second drive is located underneath the return portion of the at least one ball-belt and underneath the driver belt.

14. The conveyor system according to claim 3, wherein at least a portion of the first drive is located underneath the return portion of the at least one ball-belt and underneath the driver belt.

15. A conveyor system comprising:
a frame comprising a first longitudinal support having a first end and a second end and a second longitudinal support having a first end and a second end and a first transverse support connecting the first end of the first longitudinal support to the first end of the second longitudinal support and a second transverse support connecting the second end of the first longitudinal support to the second end of the second longitudinal support and a center longitudinal support connecting a midpoint of the first transverse support to a midpoint of the second transverse support;
an external conveyor comprising a first support shaft extending between the first end of the first longitudinal support and the first end of the second longitudinal support and a second support shaft extending between the second end of the first longitudinal support shaft and the second end of the second longitudinal support shaft and a first ball-belt mounted on the first and second support shafts along the first longitudinal support and a second ball-belt mounted on the first and second support shafts along the second longitudinal support, each of the first and second ball-belts having an internal surface defining a ball-belt interior and having an external surface, a plurality of balls mounted in the ball-belts such that a first portion of each ball in the first and second ball-belts extends beyond the respective external surfaces of the first and second ball-belts and such that a second portion of each ball in the first and second ball-belts extends beyond the internal surface of the respective first and second ball-belts,
a first drive operatively connected to the first support shaft for driving the first and second ball-belts in the longitudinal direction;
an internal conveyor comprising a driver belt supported by a first end roller and a second end roller and having a top surface in contact with the second portions of a subset of the plurality of balls and extending in the transverse direction, the internal conveyor having a first portion in the interior of the first ball-belt and a second portion in the interior of the second ball-belt, and
a second drive mounted to the center longitudinal support and operatively connected to the driver belt for driving the driver belt in the transverse direction.

16. The conveyor system according to claim 15, wherein a return portion of the first ball-belt extends between the second drive and the driver belt.

17. The conveyor system according to claim 16, wherein a return portion of the second ball-belt extends between the first drive and the driver belt.

18. The conveyor system according to claim 16, wherein the first ball-belt has an upper surface lying in a plane and the second ball-belt has a top surface lying in the plane, wherein the first ball-belt is spaced from the second ball-belt by a gap, and wherein the second drive is operatively connected to the driver belt by a power transmission means extending through the gap.

19. The conveyor system according to claim 18, wherein the power transmission means comprises a drive shaft or a drive chain or a drive belt.

20. The conveyor system according to claim 19, including:
a first tensioning roller between the first longitudinal support and the second longitudinal support and between the first support roller and the second support roller, and
a second tensioning roller between the first longitudinal support and the second longitudinal support and between the first tensioning roller and the second support roller,
wherein the first and second tensioning rollers are configured such that a spacing between a transport portion of the first ball-belt and a return portion of the first ball-belt at a location between the first tensioning roller and the second tensioning roller is less than a spacing between the transport portion and the return portion of the first ball-belt at the first support roller,
wherein a lift table receiving space is provided between the first and second tensioning rollers and between the first and second longitudinal supports, and
including a lift table extending into the lift table receiving space.

* * * * *